US008589446B2

(12) United States Patent
Peterson et al.

(10) Patent No.: US 8,589,446 B2
(45) Date of Patent: Nov. 19, 2013

(54) GRAPHICAL USER INTERFACE (GUI) TO ASSOCIATE INFORMATION WITH AN OBJECT

(75) Inventors: Trenten Peterson, Morgan Hill, CA (US); Kyla E. Town, Syracuse, NY (US); Erik Bruce Underkofler, Austin, TX (US); Ningning Wang, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1684 days.

(21) Appl. No.: 11/046,243

(22) Filed: Jan. 28, 2005

(65) Prior Publication Data

US 2006/0173808 A1    Aug. 3, 2006

(51) Int. Cl.
*G06F 17/30*    (2006.01)

(52) U.S. Cl.
USPC .......................................... 707/797; 707/802

(58) Field of Classification Search
USPC ........................... 707/103, 102, 2, 6; 715/734
See application file for complete search history.

(56) References Cited

U.S. PATENT DOCUMENTS

| | | | |
|---|---|---|---|
| 5,603,034 A | | 2/1997 | Swanson |
| 5,778,222 A | * | 7/1998 | Herrick et al. ..................... 707/9 |
| 5,983,234 A | * | 11/1999 | Tietjen et al. ............. 707/103 R |
| 6,052,688 A | * | 4/2000 | Thorsen ........................ 707/100 |
| 6,317,142 B1 | * | 11/2001 | Decoste et al. ................ 715/762 |
| 6,356,910 B1 | * | 3/2002 | Zellweger ..................... 707/100 |
| 6,684,388 B1 | * | 1/2004 | Gupta et al. ................... 717/136 |
| 6,701,311 B2 | | 3/2004 | Biebesheimer et al. |
| 6,816,175 B1 | * | 11/2004 | Hamp et al. .................. 715/854 |
| 2002/0105550 A1 | | 8/2002 | Biebesheimer et al. |
| 2002/0156879 A1 | * | 10/2002 | Delany et al. ................. 709/223 |
| 2003/0105771 A1 | * | 6/2003 | Tiefenbrun et al. ........ 707/103 R |
| 2004/0090459 A1 | * | 5/2004 | Hsu ............................... 345/762 |
| 2004/0215649 A1 | * | 10/2004 | Whalen et al. ................ 707/102 |
| 2004/0215650 A1 | * | 10/2004 | Shaji et al. .................... 707/102 |
| 2006/0136138 A1 | * | 6/2006 | Hicklin et al. .................. 702/19 |
| 2006/0167858 A1 | * | 7/2006 | Dennis et al. ..................... 707/3 |
| 2006/0173808 A1 | * | 8/2006 | Peterson et al. ................... 707/2 |

* cited by examiner

*Primary Examiner* — Sherief Badawi
(74) *Attorney, Agent, or Firm* — David W. Victor; Konrad, Raynes, Davda & Victor LLP (57) ABSTRACT

Provided is a graphical user interface (GUI) to associate information with an object. Different views are maintained providing different hierarchical arrangements of a set of objects. Selection is received of one view and one object in the selected view. Information is associated with the selected object, wherein the associated information is accessible in all views in which the object with which the information is associated is accessible.

6 Claims, 11 Drawing Sheets

FIG. 1

Folder Record

FIG. 2

Attribute Instance

FIG. 3

Metadata Record

GRAPHICAL USER INTERFACE (GUI) TO ASSOCIATE INFORMATION WITH AN OBJECT

BACKGROUND OF THE INVENTION

1. Field of the Invention

The present invention relates to a method, system, and program for providing a graphical user interface (GUI) to associate metadata with an object.

2. Description of the Related Art

A computer user may have to enter into a graphical user interface (GUI) form information about an object or file, such as a location of a file in a folder in a file system or metadata for a file. However, when manually entering data, the user may make entry mistakes, especially when location and metadata descriptors have lengthy identifiers and names.

SUMMARY

Provided is a graphical user interface (GUI) to associate information with an object. Different views are maintained providing different hierarchical arrangements of a set of objects. Selection is received of one view and one object in the selected view. Information is associated with the selected object, wherein the associated information is accessible in all views in which the object with which the information is associated is accessible.

DETAILED DESCRIPTION

Figure 1:
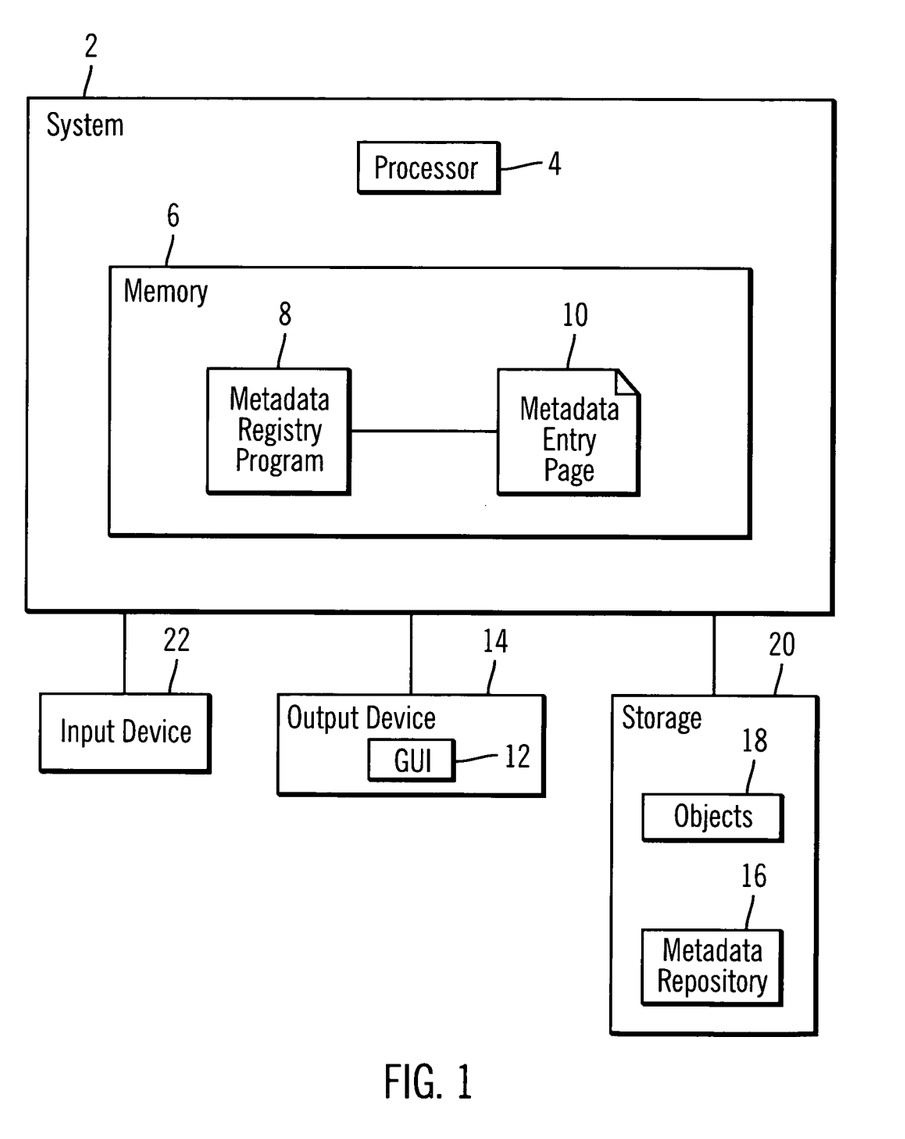
FIG. 1 illustrates an embodiment of a computing environment.

FIG. 1 illustrates a computing environment comprising a computer system 2 having a processor 4 and memory 6. The processor 4 executes a metadata registry program 8 that generates a metadata entry page 10 providing a tree view of objects and metadata attributes that may be associated with metadata for the objects. The metadata entry page 10 may be presented in a graphical user interface (GUI) 12 rendered on an output device 14 coupled to the system 2, such as a monitor. The metadata registry program 8 processes a metadata repository 16 comprising a database having metadata records for objects 18. The metadata repository 16 and objects 18 may be stored in a storage system 20.

The metadata entry page 10 may comprise a structured document, such as a document encoded in Hypertext Markup Language (HTML), Extended Markup Language (XML), etc., or other page formats. The objects 18 for which metadata records are maintained may comprise files, such as XML files or XML schema files that define an XML schema.

The system 2 is coupled to an input device 22, such as a mouse, pen-pointer, touch sensitive display screen, keyboard, voice activated input, etc., that enables a user to provide input to the system, such as input to traverse and select objects represented in the metadata entry page 10 presented in the GUI 12. The output device 14 coupled to the system 2 may comprise a computer monitor. The storage 20 coupled to the system 2 may comprise an internal or external storage device, e.g., hard disk drive, electronic memory, tape, optical storage, etc., directly coupled to the system 2 or comprise storage the system 2 communicates with over a network. The memory 6 may comprise a volatile memory device. The metadata repository 16 may comprise a relational database.

Figure 2:
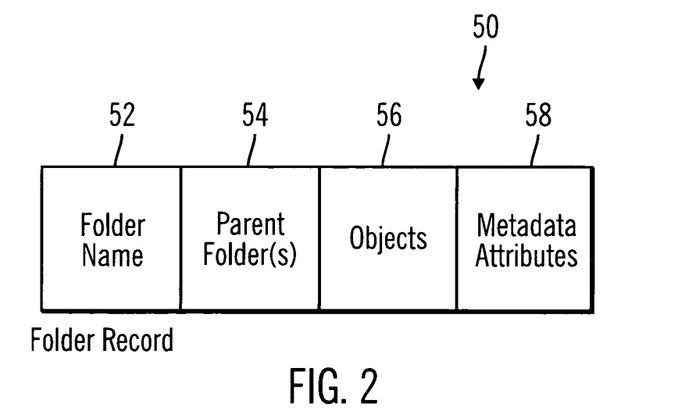
FIGS. 2, 3, and 4 illustrate embodiments of information maintained in a metadata repository.
Figure 3:
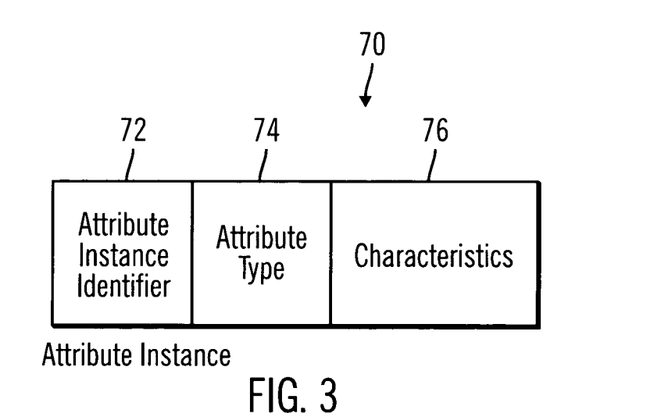
Figure 4:
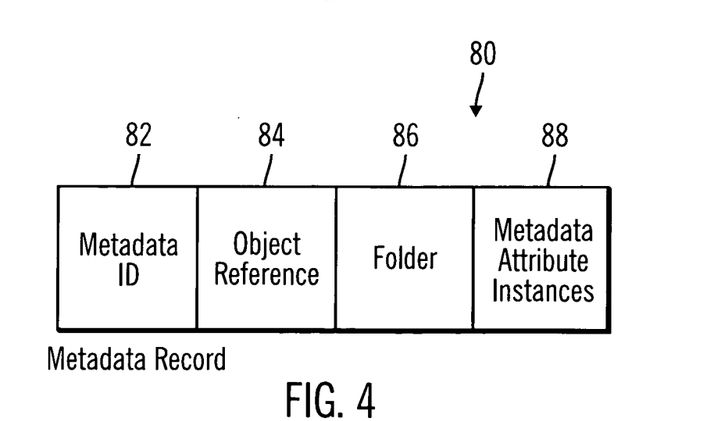

FIGS. 2, 3, and 4 illustrates records included in the metadata repository 16. FIG. 2 illustrates information that may be included in a folder record 50, where a folder groups objects in a tree view. The folder record 50 information includes: a folder name 52; any parent folders 54 of the folder, where the parent may comprise the root of the view in which the folder is displayed; objects 56 included in the folder; and metadata attributes 58 of the folder, which may identify users that have access to the folder a classification of the type of objects included in the folder, etc.

FIG. 3 illustrates an attribute instance record 70 providing information on an attribute instance of an attribute type, including an attribute instance identifier 72, such as an attribute name; an attribute type 74; and characteristics 76 of the attribute instance. For instance, the types of metadata attributes may include classifications of the object, users, access groups, organizations, etc. An instance of a classification attribute type may identify a particular classification of an object, an instance of a user attribute type may comprise a user or user group and information on the user, etc.

FIG. 4 illustrates a metadata record 80 providing metadata on an object 18, including: a metadata identifier 82 identifying the metadata record; an object reference 84 referencing the object for which the metadata is provided, which may include the location of the object 18 in storage 20; a folder 86 indicating a folder in which the object is grouped; and metadata attribute instances 88 providing the identifiers of metadata attribute instances associated with the object 18 for which the metadata record 80 is provided. The folder 86 field may also specify view in which the object is grouped. Although an object may be included in only one folder, in certain embodiments an object may be included in multiple views. The metadata repository 16 may include view records, which would include the information provided for a folder record 52, including name, parent view folders, objects grouped in the view, and any metadata attributes of the view.

Figure 5:
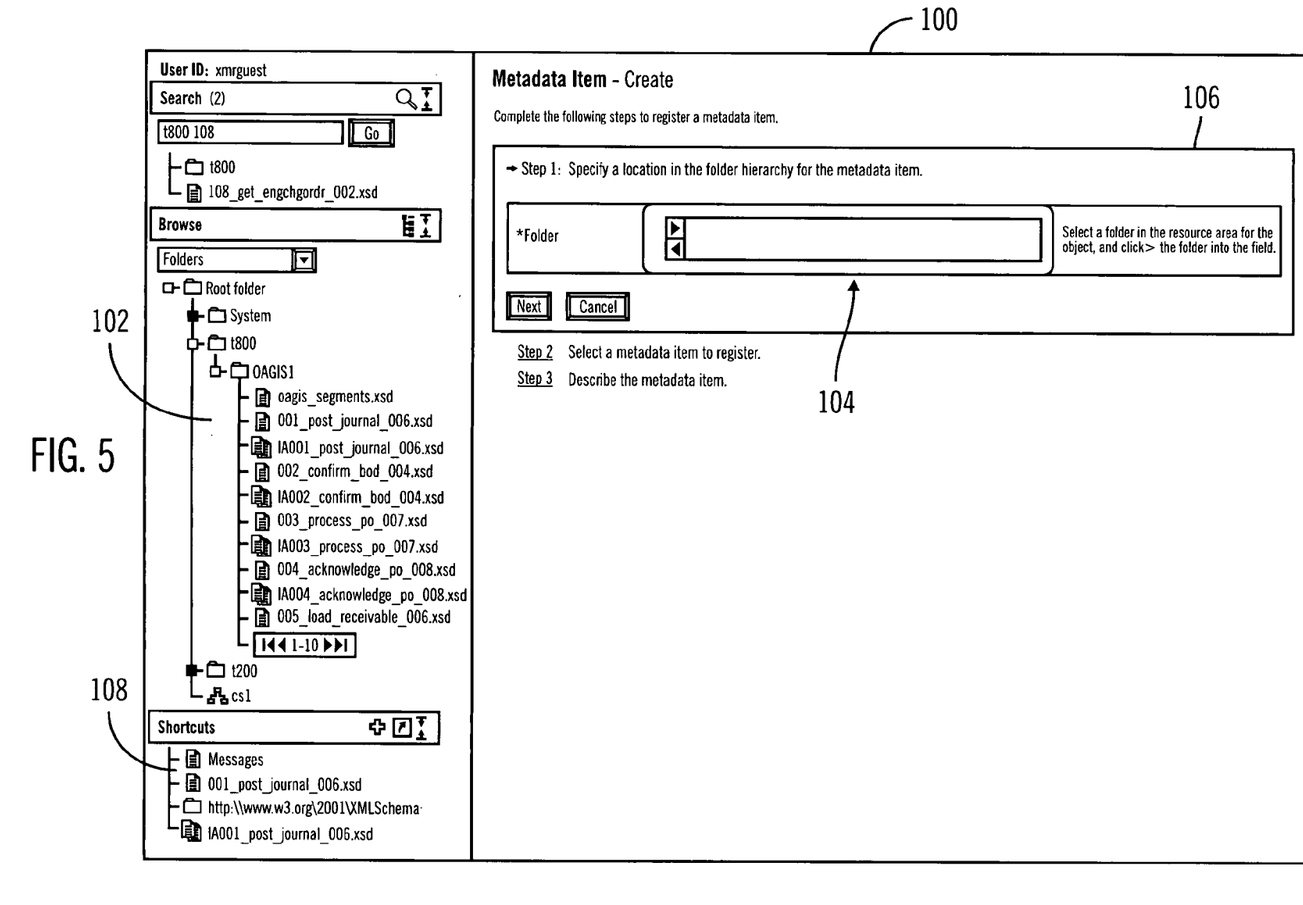
FIGS. 5-10 illustrate embodiments of graphical user interfaces (GUIs) in which a user may enter information and metadata for objects.

FIGS. 5-10 illustrate examples of metadata entry pages in which metadata may be entered for an object. FIG. 5 illustrates a metadata create page 100 that may be displayed when a user is creating a metadata record 50 for an object 18 added to the storage. The metadata create page 100 displays a folder tree view 102 of folders in which the object may be included. The user would select a folder in the folder tree view 102. The name of the selected folder may then be automatically entered into the location entry field 104 in metadata panel 106. In selecting a folder, the user may select items in a hierarchical list, such as tree view 102, or a non-hierarchical list such as the shortcuts panel 108. Upon selecting a folder in the folder tree view 102, the metadata record 50 being created would indicate the selected folder in the folder information 86 (FIG. 2) for the metadata record 50 of the object.

Figure 6:
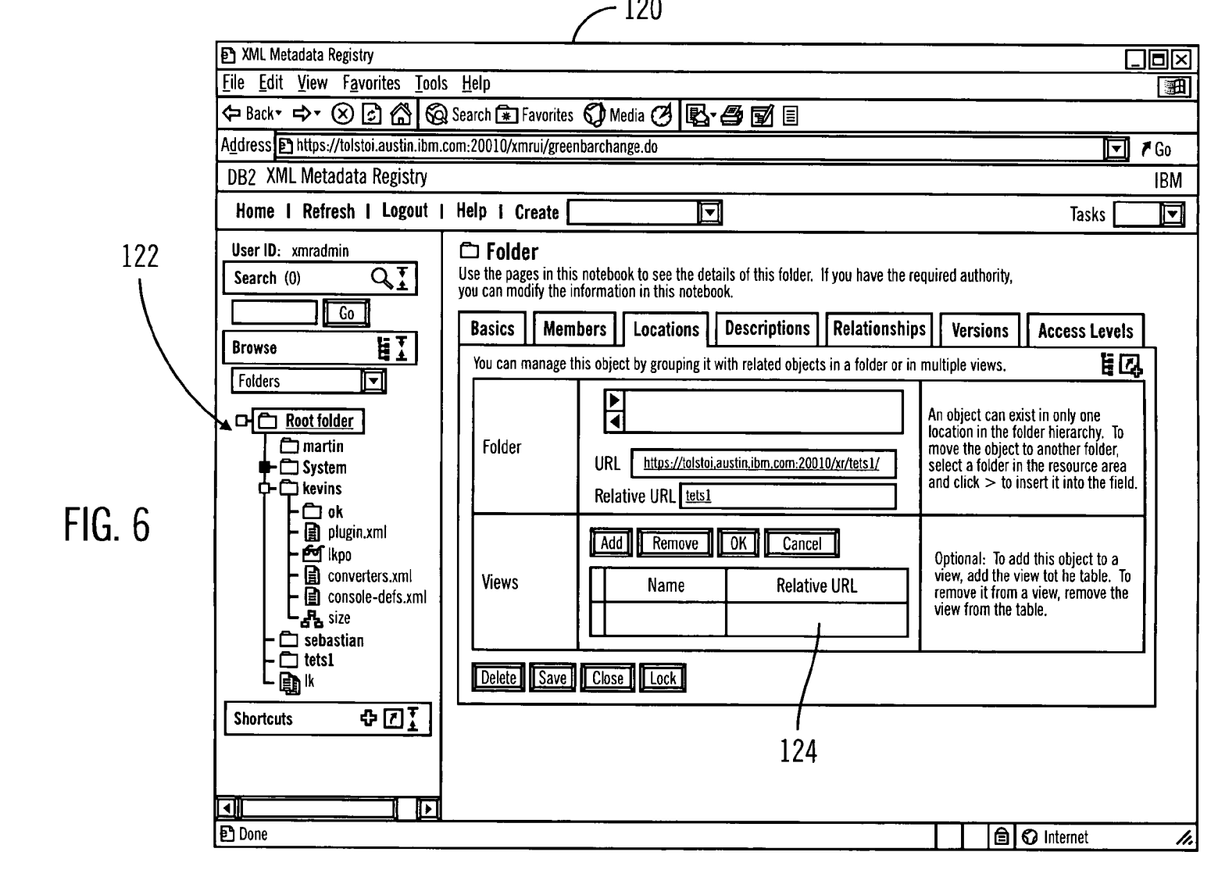

FIG. 6 illustrates a metadata entry page 120 in which the user may select a folder from the folder tree view 122 for the object, where the metadata folder 86 field would be updated with the selected folder from the folder tree view 122. The selected folder from the folder tree view 122 would be displayed in the folder entry field 124. Views entry field 126 displays any views with which the object is associated, where an object may only be included in one folder but may be included in multiple views.

The same objects in a folder may be presented differently in views, such that the same information or metadata shows up in different views according to the criteria. For instance, FIG. 6 shows objects associated with a particular user "kevins". These same objects may show up in different folders and in different views, where each view may provide a different hierarchical arrangement of a set of objects.

Figure 7:
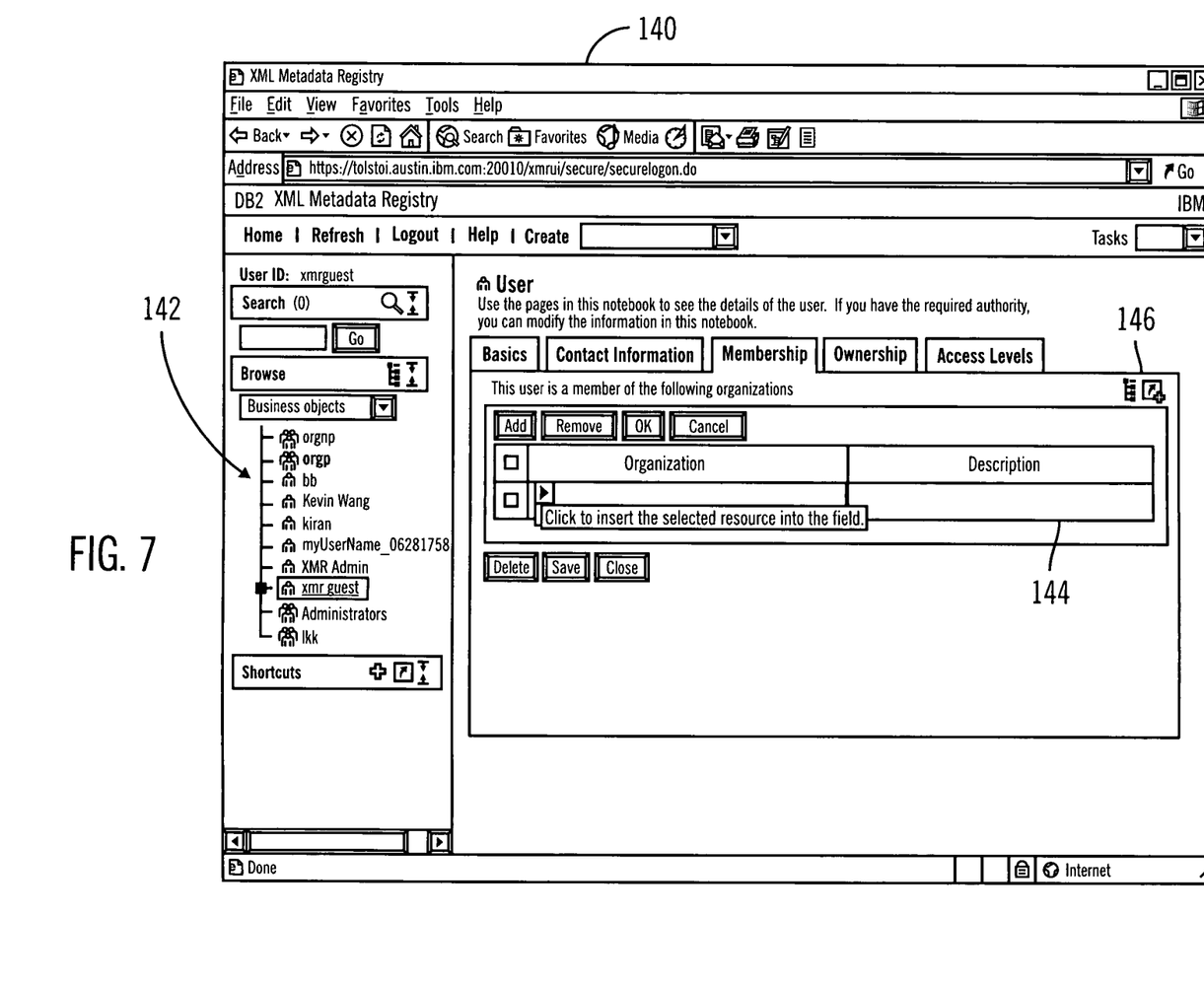

FIG. 7 illustrates a metadata entry page 140 in which the user may create an attribute instance 50 record for a user attribute type indicating a user or user group that may access the metadata for the object. The user may display a user tree view 142, referred to as "business objects", providing a list of business objects, and defining user groups or instances of the user attribute. Selection of one user group in the user tree view 142 would cause the display of the selection in the user entry box 144 in the metadata panel 146 and allow the user to set characteristics 76 for that selected user, such as contact information, groups in which the user is a member, access levels for the user, etc.

Figure 8:
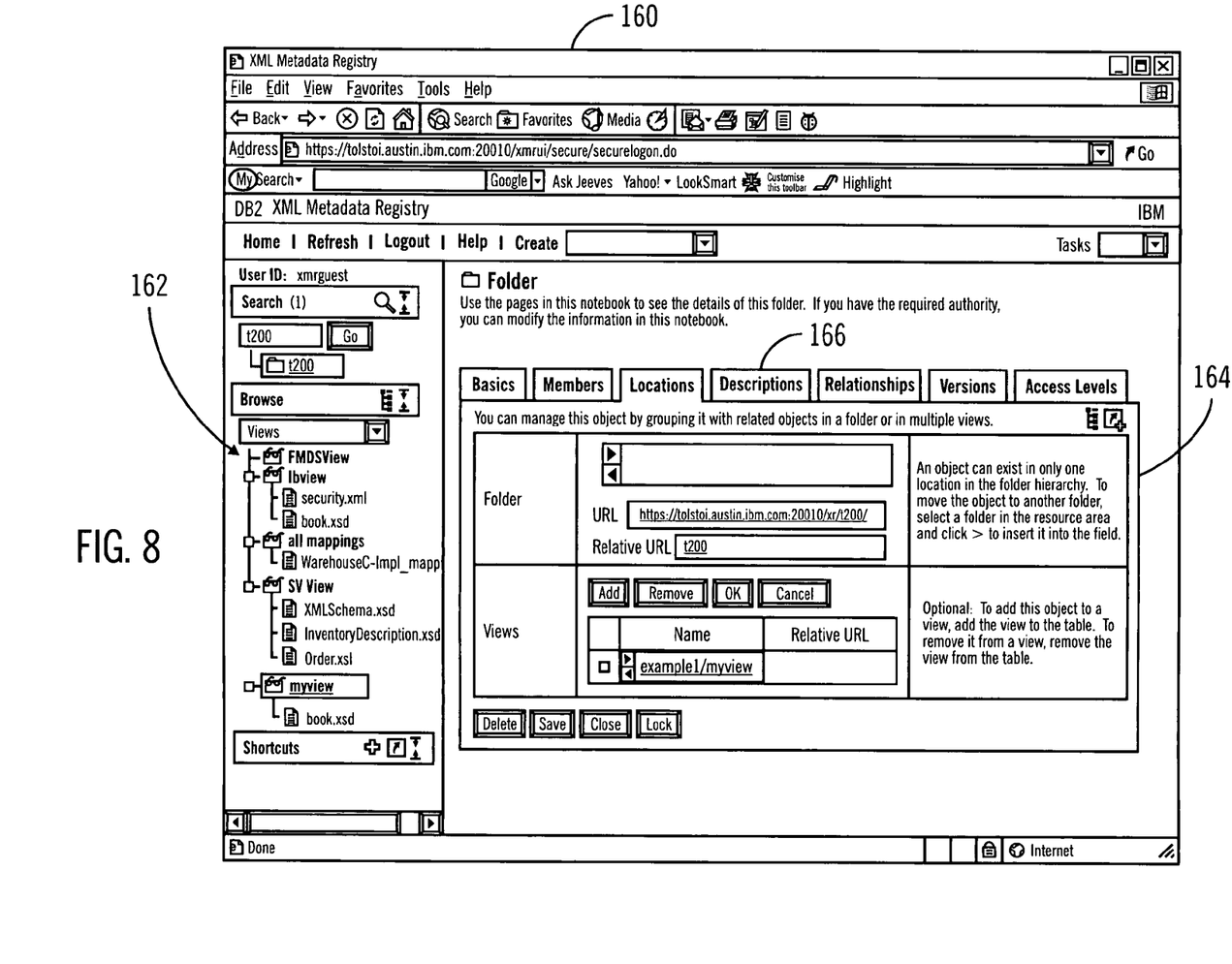

FIG. 8 illustrates a metadata entry page 160 that is generated in response to the user selecting a view folder from the view tree 162. Selection of one object within a view folder in the view tree 162 displays a metadata panel 164 in which the user may select attribute instances 88 to associate with the selected object. The metadata panel 164 shows the folder with which the selected object is associated and one or more view folders in which the object is grouped. Selecting the tabs on the metadata panel 164 allows the user to associate different instances of attribute types with the object, such as members, descriptions, relationships, access levels, etc. For instance, selection of the "Location" tab allows the user to select views and a folder in which to include the object from the view or folder tree displayed in the tree view 162 panel.

The views allow different ways for a user to visualize the elements and objects that may be selected, where the same set of elements and objects are provided in different hierarchical arrangements in different views. For instance, for a hotel, a main hierarchical list may have "floor" folders where each floor folder has a "room" object with which the hotel check-in person may enter information such as whether the room is taken, how many visitors, associated charges, etc. Alternatively, the hotel employee user may select different views that provides a different hierarchical arrangement of the "room" objects, such as a "west view", "south view", "east view", etc. providing groupings of rooms depending on which directional side of the hotel building they are located, e.g., west, south, east, north. Other views may include smoking versus non-smoking rooms, luxury, economy, suites, etc. Described embodiments provide different ways of organizing information in different hierarchical views allowing more efficient ways for a user to view and select objects, folders, etc.

Figure 9:
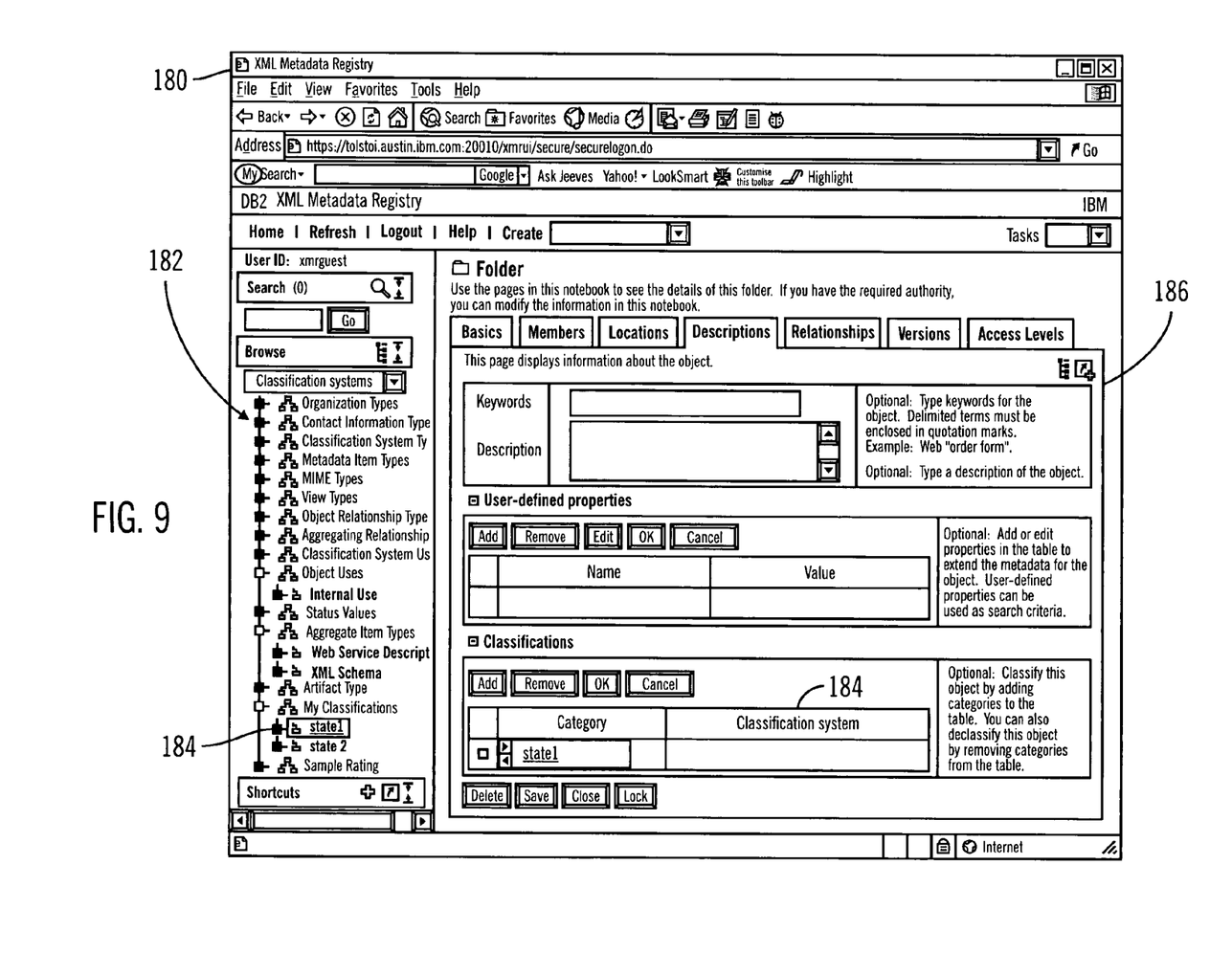

FIG. 9 illustrates a metadata entry page 180 that is generated in response to the user selecting to associate classification metadata with an object, such as may be generated by selecting the "Descriptions" tab 166 in the metadata panel 164 (FIG. 8). The page 180 displays a classifications tree view 182 of classification attribute instances the user may select to associate with an object. Selection of one classification attribute instance in the classifications tree view 182 generates the selected classification into the classifications entry 184. This selected classification instance may be added to the metadata attribute instances 88 field of the metadata record 80 (FIG. 4) for the object.

The classifications page 180 may allow classifications having different states to associate with an object, such as "state 1" and "state 2" 182.

Figure 10:
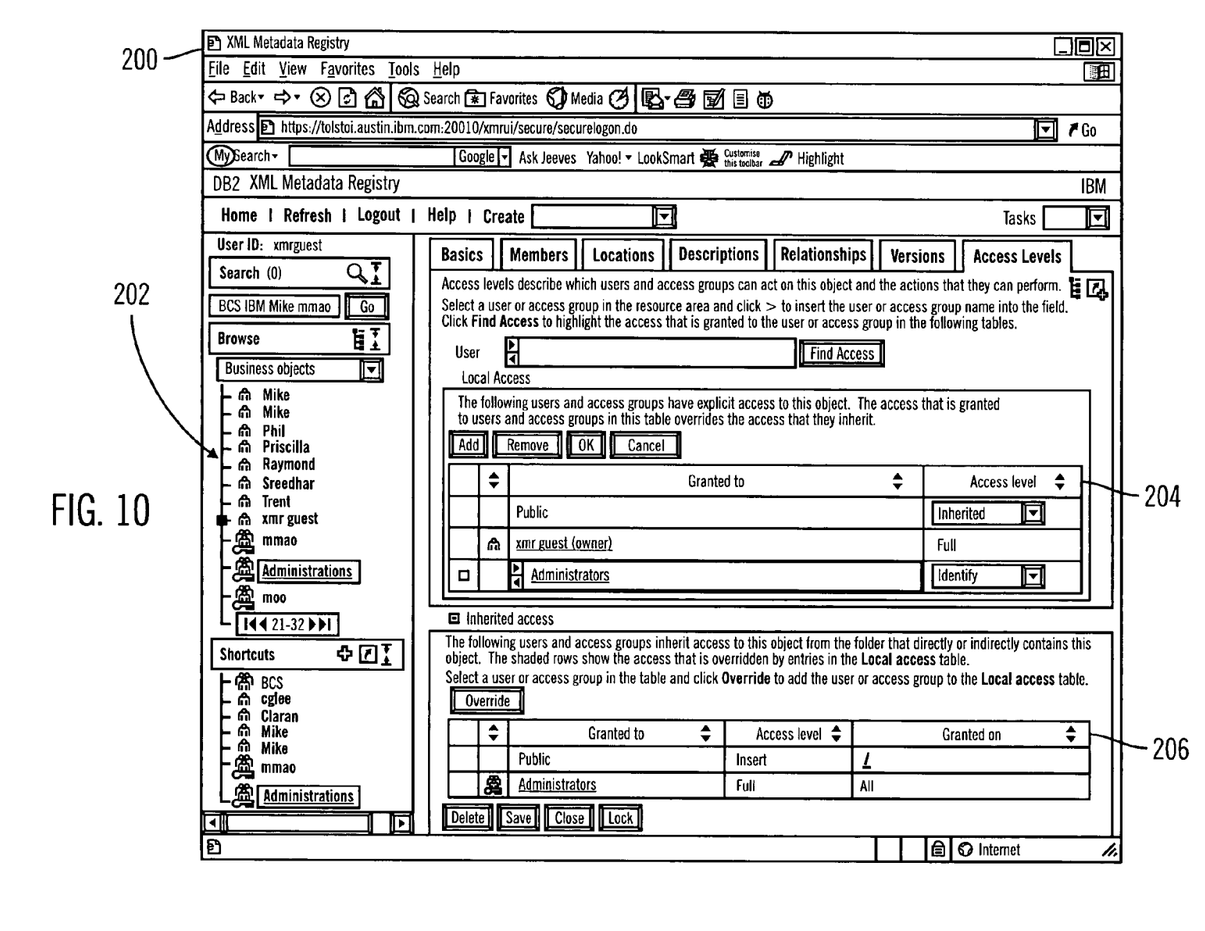

FIG. 10 illustrates a metadata entry page 200 generated in response to the user selecting to associate users at different access levels. The page 200 displays a user group tree view 202 from which the user may select users to include with the attribute instances 88 in the metadata record 80 for the object. A selected user is displayed in the users entry field 204. The page 200 displays in panel 206 users that have different levels of access to the object.

Figure 11:
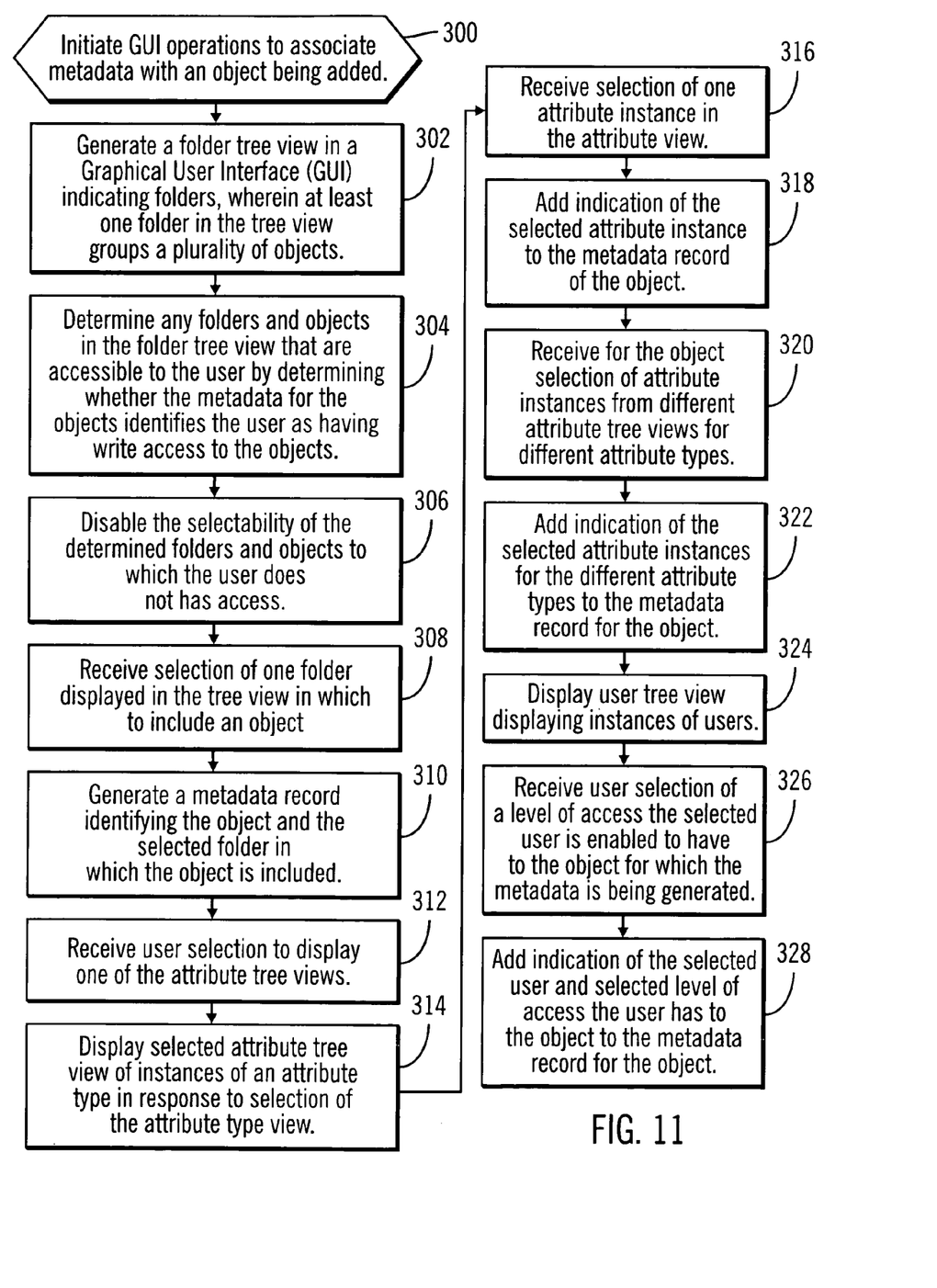
FIGS. 11, 12, 13, and 14 illustrate embodiments of operations to add information and metadata for objects to a repository.

FIG. 11 illustrates an embodiment of operations performed by the metadata registry program 8 to enable the user to select locations and attribute instances from a tree view to add to a metadata record 80 providing metadata for an object. Upon initiating (at block 300) GUI operations to associate metadata 80 with an object 18 being added, the metadata registry program 8 generates (at block 302) a folder tree view in a Graphical User Interface (GUI) indicating folders, e.g., 100, wherein at least one folder in the tree view groups a plurality of objects. A determination is made (at block 304) of any folders and objects in the folder tree view that are accessible to the user by determining whether the metadata record 80 for the objects displayed in the folder tree view identify the user as having write access to the objects. The metadata registry program 8 then disables (at block 306) the selectability of the determined folders and objects to which the user does not have access. The user is not enabled to select and modify metadata for the objects whose selectability is disabled in the tree view.

Upon receiving (at block 308) user selection of one folder displayed in the tree view, e.g., 102 (FIG. 5) in which to include an object when creating a metadata record for the object, the metadata registry program 8 generates (at block 310) a metadata record 80 identifying the selected object 84 and the selected folder 86 in which the object is included. Upon receiving (at block 312) user selection to display one of the attribute tree views, such as to select classifications, users, descriptions, etc., the selected attribute tree view of instances of an attribute type is displayed (at block 314). For instance, classification tree view 182 shows instances of classifications, such as "state1" and "state2", which the user may select from the classification tree view 182 to include with the metadata attribute for the object. Upon selection (at block 316) of one attribute instance in the attribute tree view, the metadata registry program 8 adds (at block 318) indication of the selected attribute instance to the metadata record 80 of the object.

Further, the metadata registry program 8 may receive (at block 320) for the object selection of attribute instances from different attribute tree views for different attribute types, e.g., classifications, users, etc. Indication of the selected attribute instances for the different attribute types is made (at block 322) to the metadata record 80 for the object. The metadata registry program 8 then displays (at block 324) the user tree view displaying instances of users, such as the user tree view 202 of FIG. 10. Upon receiving (at block 326) user selection of a level of access the selected user is enabled to have to the object, indication of the selected user and selected level of access for the user is added (at block 328) to the metadata record for the object.

Figure 12:
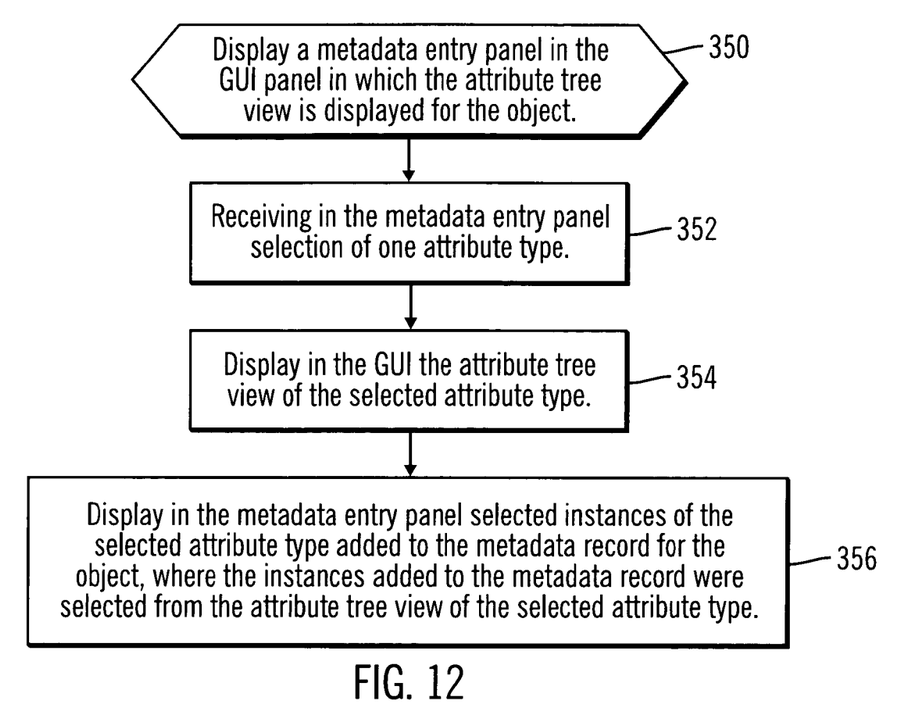

FIG. 12 illustrates operations performed by the metadata registry program 8 to render information in the GUI 12 for user selection. The metadata registry program 8 displays (at block 350) a metadata entry panel in the GUI panel in which the attribute tree view is displayed for the object. FIG. 9 illustrates an example of a metadata entry panel 186 to enable the user to select classification attribute instances from the classification tree view 182. Upon receiving (at block 352) in the metadata entry panel, e.g., 186 selection of one attribute type, e.g., "Descriptions", the attribute tree view, e.g., 182, of the selected attribute type is displayed (at block 354) in the GUI. The metadata entry panel 186 may further display (at block 356) instances of the selected attribute type added to the metadata record for the object, where the instances added to the metadata record were selected from the attribute tree view of the selected attribute type. For instance, in FIG. 9, panel 184 displays instances of selected classifications that define metadata for the object.

Figure 13:
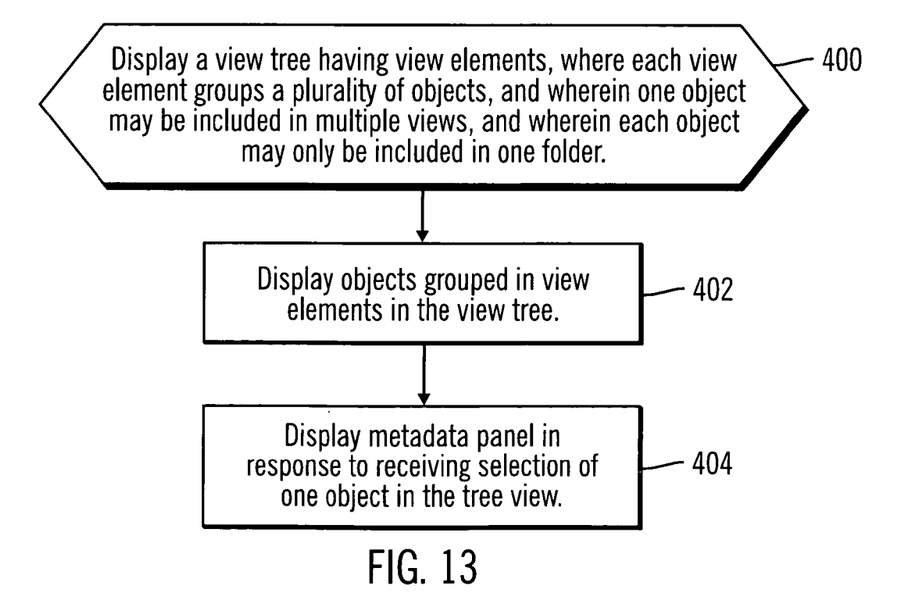

FIG. 13 illustrates operations performed by the metadata registry program 8 to display a tree view, where each view provides a different hierarchical arrangement of objects such that the same objects may be grouped in different views. The metadata registry program 8 displays (at block 400) a view tree having view elements. FIG. 8 illustrates a tree view 162. The tree view 162 further displays (at block 402) objects grouped in view elements in the view tree. For instance, view "myview" has one object grouped within, "book.xsd". A metadata panel for one object is displayed (at block 404) in response to receiving selection of one object in the view tree view. For instance, FIG. 8 shows metadata panel 164 which enables the user to select metadata attributes to add to the metadata record 80 for the object selected in the tree view 162.

With the described operations of FIGS. 11-13, the user may select metadata attributes to add to a metadata record for an object from a tree view. User selection causes the metadata registry program to automatically add the selected location and metadata to the metadata record, thereby eliminating user entry errors that could result from direct entry of metadata attributes for metadata records. Further, selection of metadata attribute instances in a tree view provides a visually efficient technique for enabling the user to review and select metadata attributes to add to a metadata record for an object.

In the above described embodiments, the user associated metadata with objects. In alternative embodiments, the described tree and hierarchical views may be used to associate any type of information with an object. "Information" can be attributes of an object or any other information to be associated with an object. For instance, an object can represent an instance of a person, such as a client, employee, user, etc. and the information entered through the tree or other views can be information relevant to that person. The views may organize the person objects according to different attributes of the person, such as the city in which they live, etc. In the hotel example, the information maintained for a guest object may include the room they are staying in, payment method, duration of stay, etc. Different views may organize the guest objects in different hierarchical arrangements, one view may group visitor objects by the city in which the guest lives, another by the floor on which they are staying, etc., another by class of guests, VIP, first time guests, etc. Thus, the described embodiments provide the capability to create different views of different hierarchical arrangements of objects to allow information or metadata to be associated with the object in the different views. When the user observes the same information arranged in different hierarchical views of the object, the user observes only valid information and attributes associate with the objects.

Figure 14:
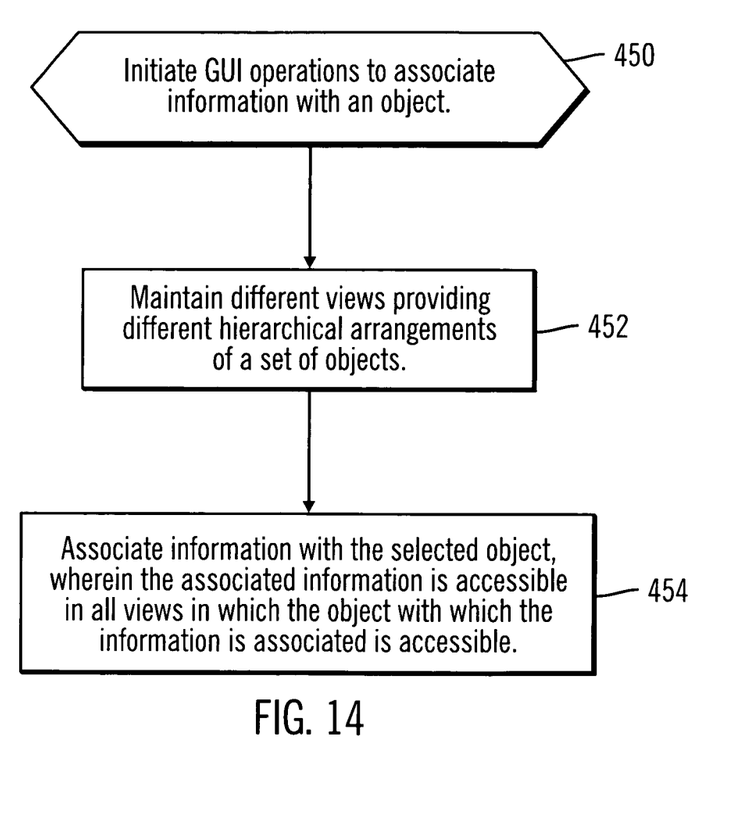

FIG. 14 illustrates a further embodiment of operations to associate information with a selected object. Upon initiating (at block 450) GUI operations to associate information with an object, a GUI program, such as the metadata registry program 8, maintains (at block 452) different views providing different hierarchical arrangements of a set of objects. The GUI program, e.g., metadata registry program 8, associates (at block 454) information with the selected object, wherein the associated information is accessible in all views in which the object with which the information is associated is accessible.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The illustrated operations of FIGS. 11, 12, 13, and 14 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

maintaining different attribute tree views providing different hierarchical arrangements of a set of objects wherein each attribute tree view organizes the objects in different hierarchical arrangements according to a different attribute type of the attribute types associated with the objects, wherein at least one object is associated with different attribute tree views;

receiving selection of one object in one of the attribute tree views;

receiving user selection to display one of the attribute tree views;

displaying the objects in the hierarchical arrangement of the selected attribute tree view that organizes the objects according to the attribute type associated with the attribute tree view;

receiving selection of one attribute instance in the displayed attribute view;

associating the selected attribute instance with the selected object by indicating the selected attribute instance with a metadata record for the selected object, wherein the associated attribute instance for the selected object is accessible in views in which the selected object with which the attribute instance is associated is accessible, and wherein the selection of one of the objects within one of the views enables the user to select attribute instances to associate with the selected object;

receiving, for the object, selection of attribute instances from different attribute tree views for different attribute types;

associating the selected attribute instances for the different attribute types selected from the different attribute tree views with the selected objects;

receiving selection of a folder from a folder tree view for the selected object to associate the selected folder from the folder tree view with the selected object, wherein the selected object may only be included in one folder but be included in multiple views; and indicating the selected folder in which the selected object is to be included in the metadata record for the selected object.

2. The method of claim 1, wherein the folder tree view includes a plurality of folders in a hierarchical arrangement, wherein each folder includes further folders or objects, wherein each attribute view includes a plurality of folders in a hierarchical arrangement, wherein each folder in the attribute tree view includes further folders or attribute instances of the attribute type represented by the attribute tree view.

3. The method of claim 1, wherein one attribute tree view comprises a classification tree view displaying instances of classifications that are applied to the objects, wherein selection of one classification instance associates the selected classification instance with the selected object for which the classification instance was selected.

4. The method of claim 3, wherein one attribute tree view comprises a user tree view displaying instances of users, wherein selection of at least one user instance from the user tree view further comprises:
  receiving user selection of a level of access the selected user has to the selected object; and
  associating the selected user and selected level of access with the selected object.

5. The method of claim 2, further comprising:
  receiving user selection of the folder tree view from a user;
  determining any folders and objects in the folder tree view that are accessible to the user; and
  disabling the selectability of the determined folders and objects to which the user does not have access, wherein the user is not permitted to modify information associated with objects whose selectability is disabled.

6. The method of claim 1, further comprising:
  displaying a panel within the attribute tree view having multiple tabs, wherein the panels allow association of different instances of attribute types with the selected object.

* * * * *